United States Patent [19]

Confer

[11] Patent Number: 5,152,718
[45] Date of Patent: Oct. 6, 1992

[54] INTERMEDIATE SHAFT ASSEMBLY FOR STEERING SYSTEM

[75] Inventor: Dale E. Confer, Bridgeport, Mich.

[73] Assignee: General Motors Corporation, Detroit, Mich.

[21] Appl. No.: 752,367

[22] Filed: Sep. 3, 1991

[51] Int. Cl.$^5$ .................. B62D 1/19; F16D 3/76; F16D 3/78

[52] U.S. Cl. .................... 464/93; 74/492; 280/775; 464/160

[58] Field of Search ............ 464/71, 89, 92, 93, 464/98, 134–136, 160, 162, 180–182, 94, 96; 74/492; 403/291, 325, 336; 280/775, 777; 180/379, 381

[56] References Cited

U.S. PATENT DOCUMENTS

| | | | |
|---|---|---|---|
| 2,753,848 | 7/1956 | Burton | 464/93 X |
| 3,543,538 | 12/1970 | Farrell et al. | 464/93 |
| 3,878,695 | 4/1975 | Pitnor | 464/89 |
| 3,901,048 | 8/1975 | Pitnor | 464/134 |
| 4,183,258 | 1/1980 | Stephan | 464/89 X |
| 4,216,842 | 8/1980 | Decouzon | 464/93 X |
| 4,385,897 | 5/1983 | Mallet | 464/182 X |
| 4,509,775 | 4/1985 | Arndt | 280/779 |
| 4,548,591 | 10/1985 | Haldric et al. | 464/160 X |
| 4,702,722 | 10/1987 | Narue et al. | 464/93 |
| 4,892,002 | 1/1990 | Groat | 74/492 |
| 5,086,661 | 2/1992 | Hancock | 464/89 X |

FOREIGN PATENT DOCUMENTS 392858 10/1990 European Pat. Off. ............. 74/492

*Primary Examiner*—Daniel P. Stodola
*Assistant Examiner*—William G. Battista, Jr.
*Attorney, Agent, or Firm*—Saul Schwartz

[57] ABSTRACT

An intermediate shaft assembly including a first shaft element coupled to a center shaft element for rotation therewith and longitudinal bodily shiftable movement relative thereto, an elastomeric ring around the center shaft element, a second shaft element having a midsection around the center shaft element, attaching lugs on the center and the second shaft elements each connected to the elastomeric ring whereby a torque path is defined between the first and the second shaft elements through the elastomeric ring, and an elastomeric bushing between the center shaft element and the midsection of the second shaft element for reinforcing the intermediate shaft assembly against beam bending.

7 Claims, 3 Drawing Sheets

INTERMEDIATE SHAFT ASSEMBLY FOR STEERING SYSTEM

FIELD OF THE INVENTION

This invention relates to intermediate shaft assemblies in automotive steering systems.

BACKGROUND OF THE INVENTION

In many automotive steering systems, a chassis mounted steering gear is connected to a steering wheel on a steering column by a steering shaft in the column and by an intermediate shaft between the steering shaft and an input shaft of the steering gear. An intermediate shaft assembly described in U.S. Pat. No. 4,509,775, issued 9 Apr. 1985 and assigned to the assignee of this invention, includes universal joints at opposite ends to accommodate non-alignment between the steering shaft and the steering gear input shaft, a vibration isolating elastic coupling, and axial compliance for accommodating manufacturing tolerances and for installation purposes. An intermediate shaft assembly according to this invention is a novel alternative to the assembly described in the aforesaid U.S. Pat. No. 4,509,775 and includes features contributing to compactness and manufacturing economy.

SUMMARY OF THE INVENTION

This invention is a new and improved intermediate shaft assembly for an automotive steering system. The intermediate shaft assembly according to this invention includes a first shaft element adapted for connection to a steering gear input shaft and a second shaft element adapted for connection to a steering shaft. The first shaft element is slidably received in a tubular center shaft element of the intermediate shaft assembly and connected to the latter for rotation as a unit therewith. A second shaft element is disposed around the center shaft element and is connected to a planar elastic ring around the center shaft element by a pair of attaching lugs of the second shaft element engaging the ring at diametrically opposite locations on the latter. A second pair of attaching lugs is rigidly attached to the center shaft element and engages the elastic ring at diametrically opposite locations on the latter spaced evenly between the first pair of attaching lugs so that a vibration isolating torque path is defined between the first and second shaft elements through the elastic ring. A bushing is disposed between the center shaft element and the second shaft element and reinforces the intermediate shaft assembly against beam bending.

DESCRIPTION OF PREFERRED EMBODIMENTS

Figure 1:
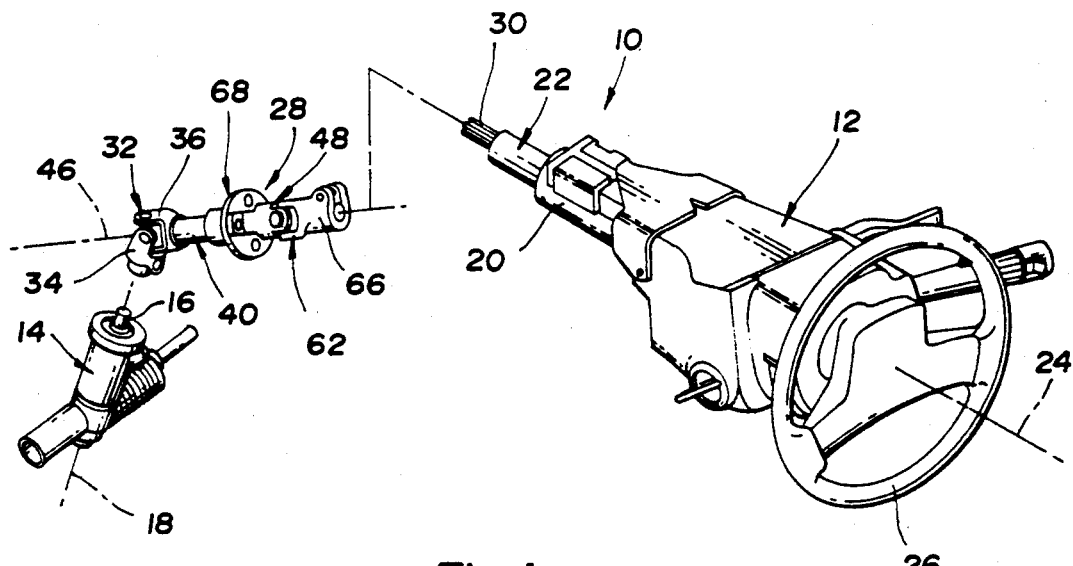
FIG. 1 is an exploded perspective view of an automotive steering system including an intermediate shaft assembly according to this invention.
Figure 2:
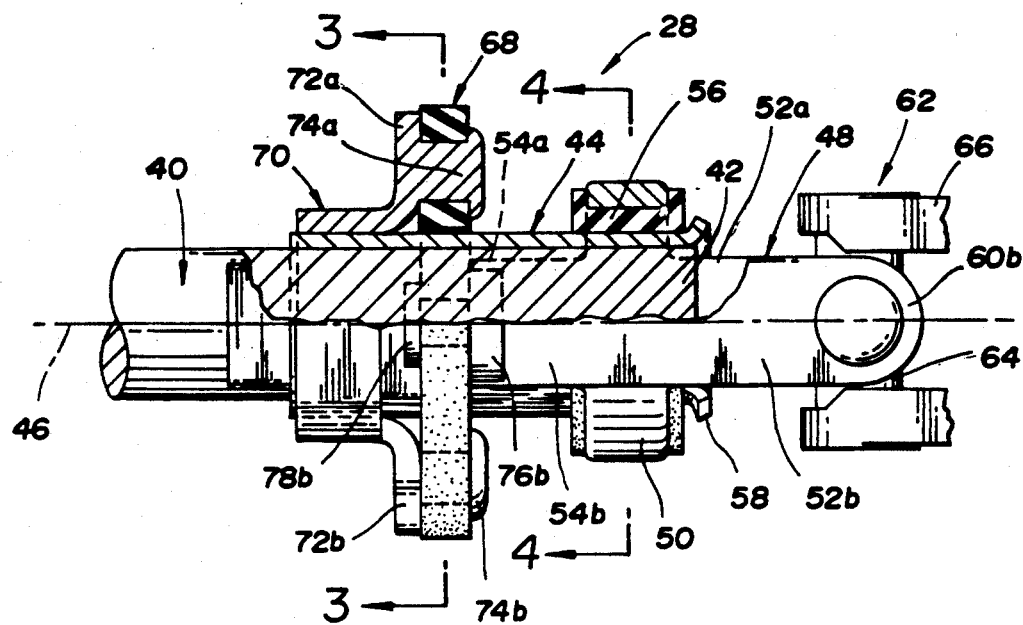
FIG. 2 is an enlarged, partially broken-away view of a portion of FIG. 1 showing the intermediate shaft assembly according to this invention.

Referring to FIG. 1, an automotive steering system 10 includes a steering column 12 adapted for support in a vehicle passenger compartment, not shown, and a rack and pinion steering gear 14 adapted for attachment to the vehicle outside the passenger compartment. The steering gear has an input shaft 16 aligned on an axis 18 of the steering gear. The steering column has a stationary mast jacket 20, a steering shaft 22 supported on the mast jacket for rotation about a centerline 24 of the steering column, and a steering wheel 26 rigidly attached to the upper end of the steering shaft for unitary rotation therewith. The axis 18 and the centerline 24 are neither axially nor angularly aligned. An intermediate shaft assembly 28 according to this invention is disposed between a lower end 30 of the steering shaft 22 and the input shaft 16 of the steering gear 14.

Referring to FIGS. 2-5, the intermediate shaft assembly 28 includes a first or lower universal joint 32 having an outboard yoke 34 adapted for rigid connection to the input shaft 16 of the steering gear, an inboard yoke 36, and a rigid spider 38 connecting the yokes in conventional fashion. The inboard yoke 36 is rigidly attached to a first shaft element 40 of the intermediate shaft assembly at a first end of the latter. The first shaft element is flattened into a non-circular, "Double-D" configuration, FIG. 3, along a substantial portion of the length of the shaft element from a second end 42 thereof, FIGS. 2 and 4, toward the first end.

Figure 3:
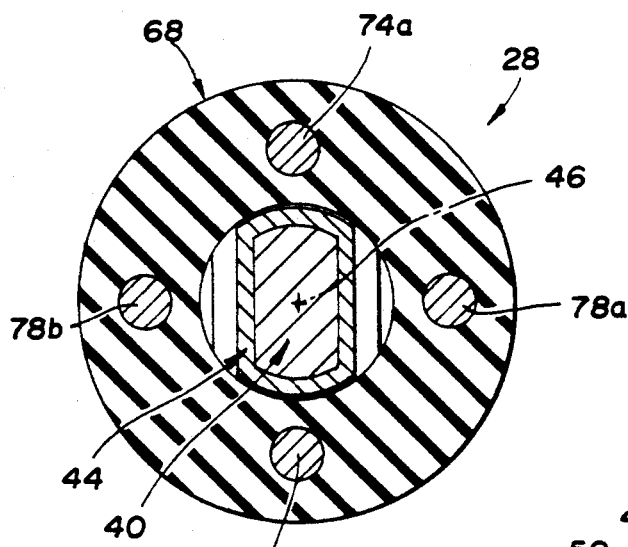
FIG. 3 is a sectional view taken generally along the plane indicated by lines 3—3 in FIG. 2.

The intermediate shaft assembly 28 further includes a tubular center shaft element 44 having a non-circular, "Double-D" configuration, FIG. 3, complimentary to the non-circular configuration of the first shaft element 40. The non-circular portion of the first shaft element 40 is slidably received in the center shaft element 44 whereby the first and center shaft elements are coupled for unitary rotation about a centerline 46 of the intermediate shaft assembly and for relative bodily shiftable movement in the direction of the centerline 46.

Figure 4:
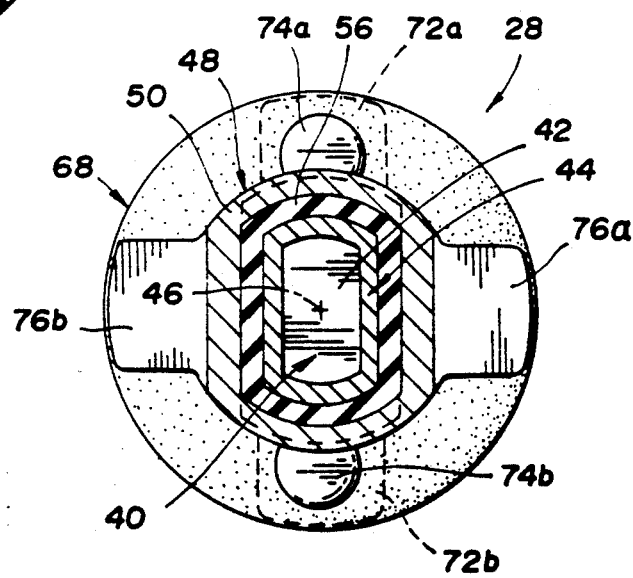
FIG. 4 is a sectional view taken generally along the plane indicated by lines 4—4 in FIG. 2.
Figure 5:
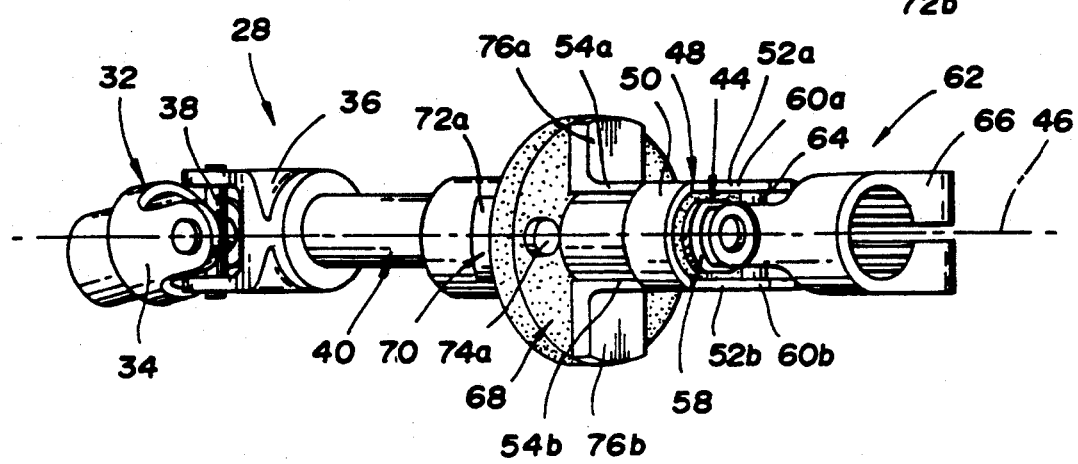
FIG. 5 is a perspective view of the intermediate shaft assembly according to this invention depicted in FIGS. 1-4.

As seen best in FIG. 4, a second shaft element 48 of the intermediate shaft assembly 28 includes a tubular midsection 50 around the center shaft element having a non-circular, "Double-D" configuration complimentary to the configuration of the center shaft element. The second shaft element further includes a first pair of arms 52a-b integral with the midsection 50 and extending parallel to the centerline 46 in one direction from the midsection and a second pair of arms 54a-b integral with the midsection and extending parallel to the centerline 46 in the opposite direction. A "Double-D" shaped bushing 56 is disposed in the gap between the midsection 50 of the second shaft element and the center shaft element 44. The center shaft element 44 has flared end 58 behind the bushing 56.

The arms 52a-b terminate at respective ones of a pair of distal ends 60a-b which cooperate in defining an inboard yoke of a second or upper universal joint 62 of the intermediate shaft assembly 28. The upper universal joint 62 further includes a rigid spider 64 pivotally connected to the arms 60a-b and to an outboard yoke 66 of the universal joint adapted for rigid attachment to the lower end 30 of the steering shaft 22.

An elastomeric ring 68 is disposed around the center shaft element 44 in a plane perpendicular to the centerline 46. A bracket 70 is welded or otherwise rigidly attached to the center shaft element and includes a pair of diametrically opposite radial lugs 72a–b parallel to the plane of the ring 68. The lugs 72a–b have respective ones of a pair of integral posts 74a–b thereon perpendicular to the plane of the ring. Each post is received in a corresponding hole in the ring 68 and headed over so that the ring is connected at diametrically opposite locations thereon to the center shaft element for rotation as a unit therewith.

The arms 54a–b on the second shaft element 48 terminate adjacent the ring 68 at respective ones of a pair of radial lugs 76a–b parallel to the ring and angularly indexed from the lugs 72a–b on the bracket 70 by 90 degrees. The lugs 76a–b have respective ones of a pair of integral posts 78a–b thereon perpendicular to the plane of the ring. Each post is received in a corresponding hole in the ring 68 and headed over so that the ring is connected at diametrically opposite locations thereon to the second shaft element for rotation as a unit therewith. The bushing 56 between the midsection 50 and the center shaft element 44 reinforces the intermediate shaft assembly against beam bending perpendicular to the centerline 46 and thereby prevents planar distortion of the ring 68.

In operation, a first torque path of the intermediate shaft assembly is defined between the first shaft element and the center shaft element through the ring 68. A second torque path of the intermediate shaft assembly is defined between the first shaft element and the center shaft element through the midsection 50 of the second shaft element and the bushing 56. The bushing 56 is less stiff than the ring 68 with respect to torque transfer between the center and second shaft elements 44,48 so that the first torque path is the primary path while the second path assures redundancy in the event that the integrity of the first path is compromised. The torsional elasticity in both paths, however, isolates the steering wheel 26 from torsional vibrations emanating from the steering gear 14.

In the direction of the centerline 46, the sliding connection between the first shaft element 40 and the center shaft element 44 affords longitudinal compliance which accommodates both installation of the intermediate shaft assembly between the steering gear 14 and the steering shaft 22 and vehicle-to-vehicle manufacturing variability. Further, the flared end 58 on the center shaft element 44 outboard of the bushing 56 defines a redundant longitudinal retainer for the second shaft element in the event that the integrity of the ring 68 is compromised.

Figure 6:
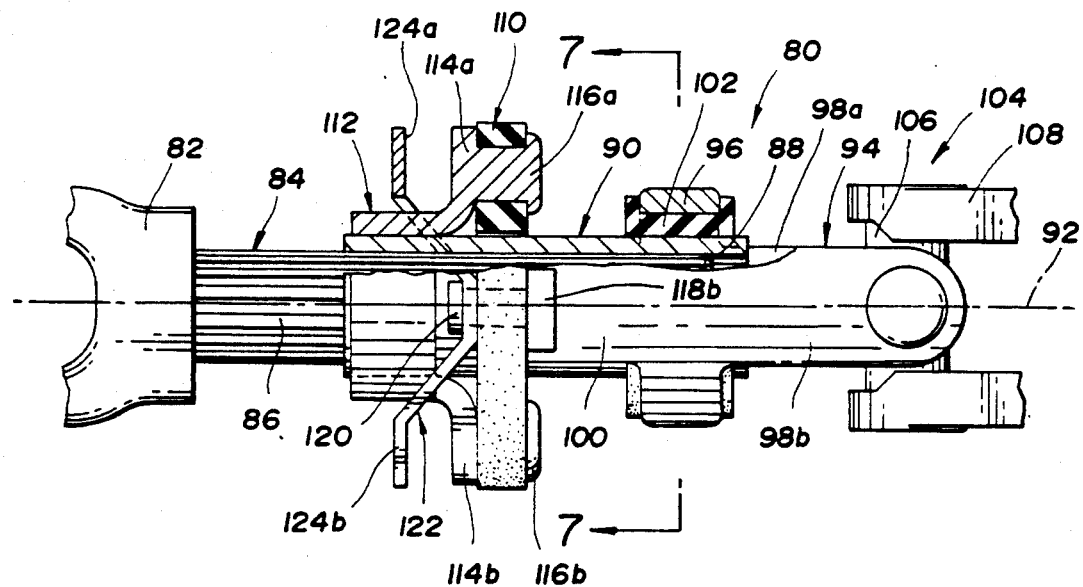
FIG. 6 is similar to FIG. 2 but showing a modified intermediate shaft assembly according to this invention.
Figure 7:
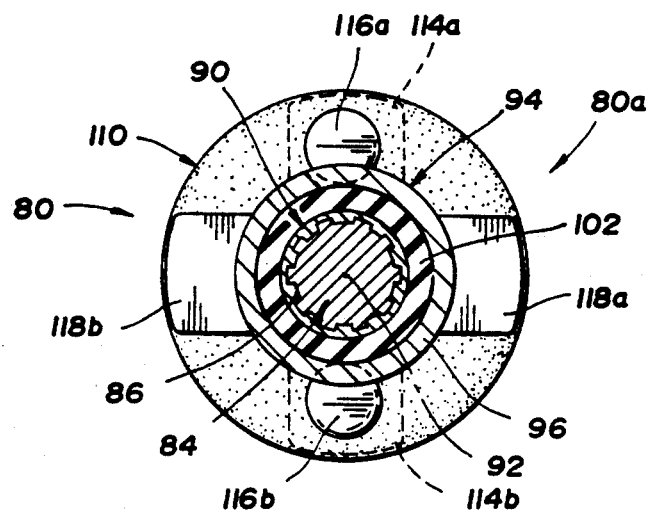
FIG. 7 is a sectional view taken generally along the plane indicated by lines 7—7 in FIG. 6.

Referring to FIGS. 6–7, a modified intermediate shaft assembly 80 according to this invention includes an inboard yoke 82 on a first shaft element 84 at a first end of the latter. The first shaft element has a plurality of longitudinal outside splines 86 thereon along a substantial portion of the length of the shaft element extending from a second end 88 thereof toward the first end.

The intermediate shaft assembly 80 further includes a cylindrical tubular center shaft element 90 having a plurality of longitudinal internal splines. The internal splines slidably receive the outside splines 86 on the first shaft element 84 whereby the first and center shaft elements are coupled for unitary rotation about a centerline 92 of the intermediate shaft assembly and for relative bodily shiftable movement in the direction of the centerline 92.

A second shaft element 94 of the intermediate shaft assembly 80 includes a cylindrical tubular midsection 96 around the center shaft element. The second shaft element further includes a first pair of arms 98a–b integral with the midsection 96 and extending parallel to the centerline 92 in one direction from the midsection and a second pair of arms integral with the midsection and extending parallel to the centerline 92 in the opposite direction, only a single arm 100 being visible in FIG. 6. An annular bushing 102 is disposed in the gap between the midsection 96 of the second shaft element and the center shaft element 90.

The arms 98a–b terminate at respective ones of a pair of distal ends which cooperate in defining an inboard yoke of a second or upper universal joint 104 of the intermediate shaft assembly 80. The upper universal joint 104 further includes a rigid spider 106 and an outboard yoke 108 adapted for rigid attachment to the lower end 30 of the steering shaft 22.

An elastomeric ring 110 is disposed around the center shaft element 90 in a plane perpendicular to the centerline 92. A bracket 112 is welded or otherwise rigidly attached to the center shaft element and includes a pair of diametrically opposite radial lugs 114a–b parallel to the plane of the ring 110. The lugs 114a–b have respective ones of a pair of integral posts 116a–b thereon perpendicular to the plane of the ring. Each post is received in a corresponding hole in the ring 110 and headed over so that the ring is connected at diametrically opposite locations thereon to the center shaft element for rotation as a unit therewith.

The arms on the second shaft element 94 represented by the arm 100 terminate adjacent the ring 110 at respective ones of a pair of radial lugs 118a–b parallel to the ring and angularly indexed from the lugs 114a–b by 90 degrees. The lugs 118a–b have respective ones of a pair of integral posts thereon perpendicular to the plane of the ring, only a portion of one post 120 being visible in FIG. 6. Each post is received in a corresponding hole in the ring 110 and headed over so that the ring is connected at diametrically opposite locations thereon to the second shaft element for rotation as a unit therewith. The bushing 102 between the midsection 96 and the center shaft element 90 reinforces the intermediate shaft assembly against beam bending perpendicular to the centerline 92 and thereby prevents planar distortion of the ring 110.

The modified intermediate shaft assembly 80 operates substantially as described above with respect to the intermediate shaft assembly 28. In addition, a retaining bracket 122 is connected to the lugs 118a–b on the second shaft element 94 through the posts thereon for rotation as a unit therewith. The retaining bracket 122 includes a pair of diametrically opposite cage portions 124a–b which envelop the lugs 114a–b. In the event that the integrity of the ring 110 is compromised, the retaining bracket 122 captures the lugs 114a–b to prevent separation between the second shaft and center shaft elements 94,90 in the direction of the centerline 92 and to sustain torque transfer therebetween.

The embodiments of the invention in which an exclusive property or privilege is claimed are defined as follows:

1. An intermediate shaft assembly comprising:

a first shaft element aligned on a longitudinal centerline of said intermediate shaft assembly, a tubular center shaft element, means coupling said first shaft element to said center shaft element for unitary rotation about said centerline and for relative bodily shiftable movement in the direction of said centerline, an elastomeric ring around said center shaft element in a plane perpendicular to said centerline, means connecting said elastomeric ring at a first plurality of diametrically opposite locations thereon to said center shaft element for rotation as a unit with said center shaft element about said centerline, a second shaft element having a tubular midsection around said center shaft element, means connecting said elastomeric ring at a second plurality of diametrically opposite locations thereon angularly indexed from said first plurality of diametrically opposite locations to said second shaft element for rotation as a unit with said second shaft element about said centerline, and elastomeric bushing means between said midsection of said second shaft element and said center shaft element reinforcing said intermediate shaft assembly against beam bending in a direction perpendicular to said centerline to prevent planar distortion of said elastomeric ring.

2. The intermediate shaft assembly recited in claim 1 wherein said means coupling said first shaft element to said center shaft element for unitary rotation about said centerline and for relative bodily shiftable movement in the direction of said centerline includes:

means defining a plurality of outside longitudinal splines on said first shaft element, and means defining a corresponding plurality of internal splines on said center shaft element slidably meshing with said outside longitudinal splines.

3. The intermediate shaft assembly recited in claim 1 wherein said means coupling said first shaft element to said center shaft element for unitary rotation about said centerline and for relative bodily shiftable movement in the direction of said centerline includes:

means on said first shaft element defining an elongated portion thereof having at least one flat side parallel to said centerline, and means on said center shaft element defining a tubular portion having a configuration complimentary to said elongated portion of said first shaft element and slidably receiving said elongated portion of said first shaft element.

4. The intermediate shaft assembly recited in claim 3 further including:

means defining a secondary coupling between said second shaft element and said center shaft element operative to transfer torque from said second shaft element to said center shaft element independently of said elastomeric ring.

5. The intermediate shaft assembly recited in claim 4 wherein said means defining said secondary coupling between said second shaft element and said center shaft element includes, means on said center shaft element defining a portion thereof having a configuration in transverse section including a flat side, and means on said midsection of said second shaft element defining a tubular portion having a configuration in transverse section complimentary to said configuration of said portion of said center shaft element having said flat side, said bushing means being disposed between said portion of said center shaft element having said flat side and said tubular portion of said midsection having said flat side.

6. The intermediate shaft assembly recited in claim 5 further including:

means on said center shaft element defining a radially outwardly flared portion thereof longitudinally outboard of said bushing between said portions of said center shaft element and said midsection having said flat side and operative to prevent separation of said center shaft element from said second shaft element in the direction of said centerline.

7. The intermediate shaft assembly recited in claim 1 wherein said means connecting said elastomeric ring at a first plurality of diametrically opposite locations thereon to said center shaft element for rotation as a unit with said center shaft element about said centerline includes, means defining a pair of rigid radial lugs on said center shaft element parallel to said plane of said elastomeric ring, and means defining a first pair of holes in said elastomeric ring at said first diametrically opposite locations thereon, and means defining a pair of integral posts on respective ones of said radial lugs on said center shaft element perpendicular to said elastomeric ring and received in respective ones of said first pair of holes in said elastomeric ring, and said means connecting said elastomeric ring at a second plurality of diametrically opposite locations thereon angularly indexed from said first plurality of diametrically opposite locations to said second shaft element for rotation as unit with said second shaft element about said centerline includes, means defining a pair of rigid radial lugs on said second shaft element parallel to said elastomeric ring, means defining a second pair of holes in said elastomeric ring at said second diametrically opposite locations thereon angularly indexed from said first pair of holes in said elastomeric ring, and means defining a pair of integral posts on respective ones of said radial lugs on said second shaft element perpendicular to said elastomeric ring and received in respective ones of said second pair of holes in said elastomeric ring.

* * * * *